(12) United States Patent
Irving et al.

(10) Patent No.: US 8,503,740 B2
(45) Date of Patent: Aug. 6, 2013

(54) METHODS AND APPARATUS FOR DIGIT SWIPE SENSOR DATA STREAMING

(75) Inventors: Richard Irving, Palm Beach Gardens, FL (US); Omid S. Jahromi, Palm Beach Gardens, FL (US); David B. Clarke, Melbourne, FL (US)

(73) Assignee: Sonavation, Inc., Palm Beach Gardens, FL (US)

( * ) Notice: Subject to any disclaimer, the term of this patent is extended or adjusted under 35 U.S.C. 154(b) by 756 days.

(21) Appl. No.: 12/119,159

(22) Filed: May 12, 2008

(65) Prior Publication Data

US 2009/0279749 A1 Nov. 12, 2009

(51) Int. Cl.
*G06K 9/00* (2006.01)

(52) U.S. Cl.
USPC .......................................... 382/120; 382/313

(58) Field of Classification Search
USPC .......................................... 382/120–124, 313
See application file for complete search history.

(56) References Cited

U.S. PATENT DOCUMENTS

| | | | | |
|---|---|---|---|---|
| 7,197,168 B2* | 3/2007 | Russo | ............................. | 382/125 |
| 7,412,083 B2* | 8/2008 | Takahashi | ..................... | 382/124 |
| 7,729,521 B2* | 6/2010 | Morguet | ........................ | 382/124 |
| 7,760,920 B2* | 7/2010 | Abiko | ............................ | 382/124 |
| 2003/0002719 A1* | 1/2003 | Hamid et al. | .................. | 382/124 |
| 2003/0021495 A1* | 1/2003 | Cheng | ............................ | 382/312 |
| 2005/0238211 A1* | 10/2005 | Du et al. | ........................ | 382/124 |
| 2005/0238212 A1* | 10/2005 | Du et al. | ........................ | 382/124 |
| 2006/0078178 A1* | 4/2006 | Shatford | ........................ | 382/124 |
| 2006/0210120 A1* | 9/2006 | Rowe et al. | .................... | 382/115 |
| 2011/0038513 A1* | 2/2011 | Du et al. | ........................ | 382/124 |

\* cited by examiner

*Primary Examiner* — Jingge Wu
(74) *Attorney, Agent, or Firm* — Kenneth J. Lukacher Law Group

(57) ABSTRACT

Methods and apparatus for processing biometric digit data variously include scanning a digit in a transverse direction relative to an array of sensor elements, detecting the scanned digit and/or a predetermined characteristic of the scanned digit, outputting from individual sensor elements of the array of sensor elements respective continuous streams of biometric data associated with the scanned digit, discrete sampling the respective continuous streams of data, and reconstructing the discrete sampled data. The discrete sampled data may be directly reconstructed, e.g., in accordance with a reconstruction characteristic associated with detecting and/or discrete sampling the scanned digit, to form a biometric characteristic image associated with the digit. Optionally, the respective continuous streams of data may be stored for later discrete sampling, or discrete sampled data may be stored for later reconstruction to form a biometric characteristic image associated with the digit.

44 Claims, 5 Drawing Sheets

METHODS AND APPARATUS FOR DIGIT SWIPE SENSOR DATA STREAMING

FIELD OF THE INVENTION

The present invention relates generally to digit swipe sensor technology. More particularly, the present invention relates to methods and apparatus for processing continuous stream biometric data of a scanned digit.

BACKGROUND

Swipe sensor methods and apparatus for capturing biometric digit data, such as fingerprints, are known. Common swipe sensor apparatus and methods typically include an M×N rectangular grid array of sensor elements. An M×N array of sensor elements may be used to capture a series of biometric data image slices representative of a digit (e.g., a finger) as the digit moves relative to the M×N sensor array in a swipe or scanning motion. For example, a digit may be swiped perpendicular to a width of the rectangular sensor array. Each sensor element may form a pixel of an image slice, where an image slice corresponds to a collection of data points formed by taking one data sample from each sensor element of the M×N grid array of sensor elements. An image slice may be recorded (stored) in memory, e.g., by recording all of these data samples as a group, and/or imaged. A series of discrete image slices may be captured at fixed time intervals and stitched together to reconstruct an image of a digit moving across the sensor array. A series of image slices may be captured before the digit moves a distance equal to the height of the sensor array, and the series of image slices then may be reconstructed to form a composite image. Such reconstruction of the series of slices may provide additional data points spatially offset among different slices so as to fill in gaps between data points of the sensor array in any given slice. Such reconstruction also may provide a final composite image larger than the M×N rectangular sensor array. Recording swipe biometric data in slices historically requires collection of sensor generated data at a fixed time interval that is limited by a maximum capture rate of the grid of sensor elements. For example, if there are N rows of pixels, and if a finger is not moved more than the distance covered by the N rows by the time the next slice is recorded, consecutive image slices may be stitched together to form a continuous, composite image larger than the M×N sensor array.

Although M×N array swipe sensors and methods have utility in many applications, such swipe sensors and methods have a drawback in that recording the data in image slices of M×N elements requires that the data be recorded (stored) and post-processed in order to reconstruct (stitch) the image slices together into a recognizable image of a fingerprint or other biometric image of the digit. Also, most M×N array swipe sensors cannot freeze the data from all sensor elements of the M×N array at one instant in time. The sensor elements of a M×N sensor array typically are sampled (digitized) sequentially, element by element, row by row. This sequential sampling takes a finite time and introduces an image skew due to the fact that a finger moves, perhaps as much as the full N lines, between the time the first sensor element of the M×N array is sampled and the time the last sensor element of the M×N array is sampled.

Therefore, a need exists for a biometric swipe sensor and data processing method that overcomes one or both of these drawbacks.

SUMMARY

Aspects of the invention include methods and apparatus for variously detecting, capturing, generating, outputting, recording, storing and processing continuous stream biometric data of a scanned digit.

Aspects of the invention include methods and apparatus for processing biometric digit data variously including scanning a digit relative to an array of sensor elements, detecting the scanned digit and/or a predetermined characteristic of the scanned digit, outputting from individual sensor elements of the array of sensor elements respective continuous streams of biometric data associated with the scanned digit, discrete sampling the respective continuous streams of data, and reconstructing the discrete sampled data. In aspects and exemplary embodiments, the discrete sampled data may be directly reconstructed to form a biometric characteristic image associated with the digit. In aspects and exemplary embodiments, the respective continuous streams of data may be stored for later discrete sampling, or discrete sampled data may be stored for later reconstruction to form a biometric characteristic image associated with the digit.

Aspects and exemplary embodiments of the invention include a method for processing biometric digit data variously including scanning a digit in a transverse direction relative to an array of sensor elements, detecting the scanned digit and/or a predetermined characteristic of the scanned digit, outputting from individual sensor elements of the array of sensor elements respective continuous streams of data associated with the digit, and recording the continuous streams of data. Exemplary embodiments further may include detecting an amount of scanning movement in the transverse direction of the array of sensor elements and recording the continuous streams of data together with, or in accordance with, data associated with the amount of scanning movement (or scanning speed) in the transverse direction.

Aspects and exemplary embodiments of the invention include a method for processing biometric digit data comprising receiving in parallel a plurality of continuous streams of data, where the continuous streams of data are associated with respective individual sensor elements of an array of sensor elements and generated in response to scanning a digit in a transverse direction relative to the array of sensor elements, and discrete sampling the plurality of continuous streams of data in accordance with a reconstruction characteristic. In exemplary embodiments, discrete sampling may be performed in accordance with a predetermined reconstruction characteristic. In exemplary embodiments the reconstruction characteristic may be a predetermined timing of the discrete sampling. In exemplary embodiments the reconstruction characteristic may be determined by a relative movement or relative speed of a scanned digit during scanning and discrete sampling.

Aspects and exemplary embodiments of the invention include biometric digit data processing apparatus including an array of sensor elements configured to detect a digit scanned in a transverse direction relative to the array of sensor elements, where individual sensor elements of the array of sensor elements output respective continuous streams of data associated with the digit detected by the individual sensor elements during scanning, and a sampler that discrete samples the continuous streams of data output in parallel by the individual sensor elements in accordance with a reconstruction characteristic. Exemplary embodiments further may include a motion sensor that detects an amount of scanning motion of the digit in the transverse direction, and the sampler may discrete sample the continuous streams of data in accordance with an amount of scanning motion or scanning speed detected by the motion sensor. In exemplary embodiments, the sampler may discrete sample the continuous streams of data in accordance with a predetermined or fixed time interval, or at a sampling rate determined by a predetermined spatial resolution accuracy.

Aspects and exemplary embodiments of the invention include biometric digit data processing apparatus including an array of sensor elements configured to detect a digit scanned in a transverse direction relative to the array of sensor elements, where individual sensor elements of the array of sensor elements output respective continuous streams of data associated with the digit detected by the individual sensor elements during scanning, and a recorder/memory that records in parallel the respective continuous streams of data output by the individual sensor elements.

Aspects and exemplary embodiments of the invention include biometric digit data processing apparatus including an array of sensor elements configured to detect a digit scanned in a transverse direction relative to the array of sensor elements, where individual sensor elements of the array of sensor elements output respective continuous streams of data associated with the digit detected by the individual sensor elements during scanning, a sampler that discrete samples the continuous streams of data, and a recorder/memory that records the discrete sampled data. In exemplary embodiments, the discrete sampled data may be multiplexed prior to recording/storing the data in memory.

These and other aspects, embodiments and features of the invention readily will be apparent when viewed in light of the accompanying drawings and detailed description of embodiments. The accompanying drawings, which are incorporated herein and form a part of the specification, illustrate exemplary embodiments of the present invention and, together with the written description, further serve to explain principles of the invention and to enable a person skilled in the art to make and use the invention.

BRIEF DESCRIPTION OF THE DRAWINGS

FIG. 2A illustrates a digit (finger) scanned relative to a finger swipe device; FIG. 2B schematically illustrates a scan interface between a finger and sensor array; and FIG. 2C schematically illustrates finger swipe apparatus including a sensor array, a motion sensor, a discrete sampler and imaging device.

FIG. 3A illustrates an alternative sensor array configuration including sensor elements arranged in a stepped or staggered pattern; and FIG. 3B illustrates an alternative sensor array configuration with integral motion sensor array.

Figure 1:
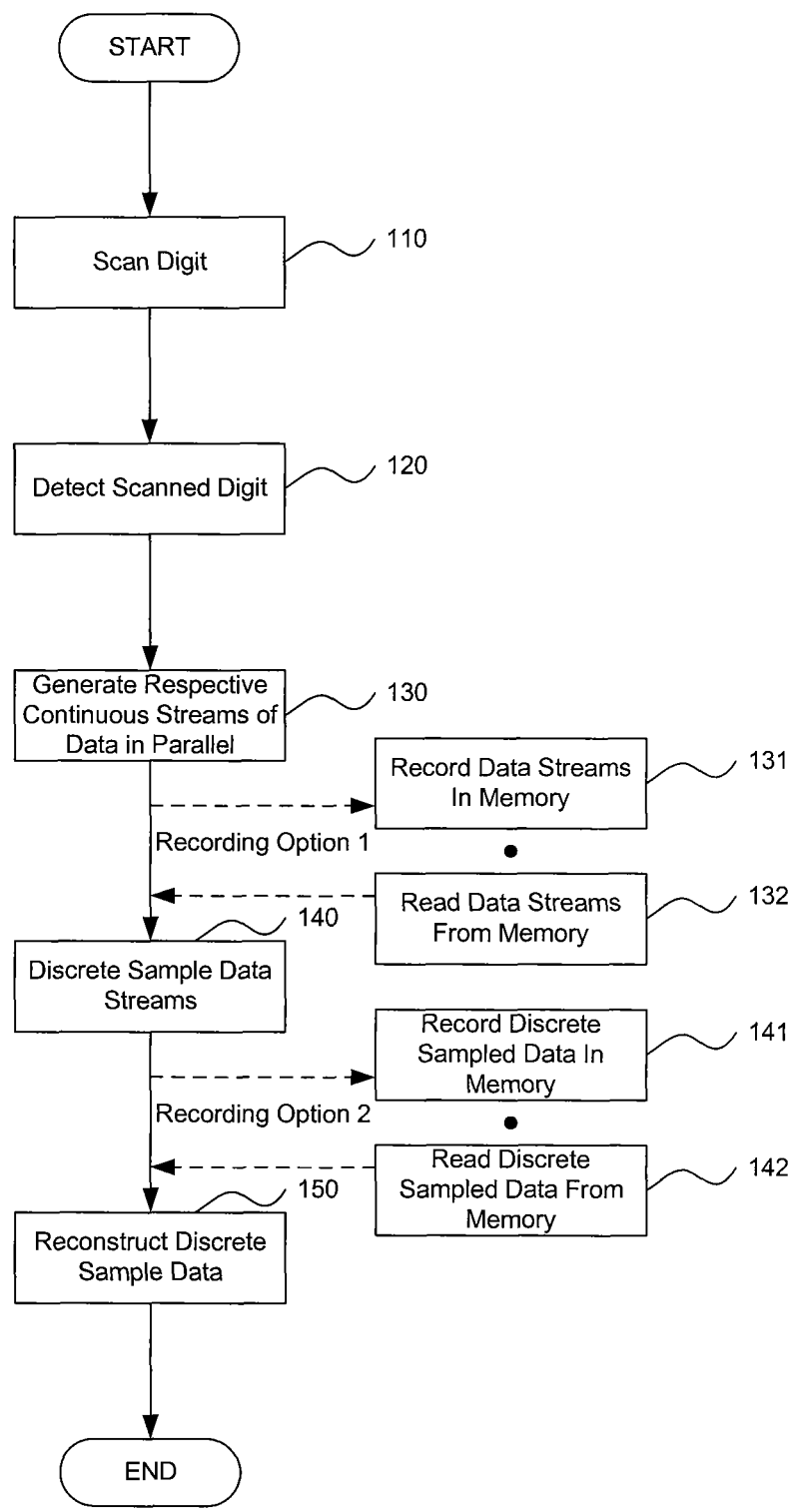
FIG. 1 is a flow chart schematically illustrating exemplary processes of various swipe sensor data processing methods of the present invention.

Embodiments of the present invention are described below with reference to the accompanying drawings. In the drawings and written description, like reference numerals generally indicate like, functionally similar and/or structurally similar elements. The drawing in which an element first appears is indicated by the leftmost digit(s) in the reference number.

DETAILED DESCRIPTION OF EMBODIMENTS

FIG. 1 illustrates various alternative method processes for processing biometric finger swipe streaming information in accordance with various aspects of the present invention. As illustrated in FIG. 1, the processing variously may include detecting, capturing, generating, outputting, recording, storing, discrete sampling (digitally converting or "digitizing") and reconstructing biometric characteristic data. Exemplary apparatus suitable for executing various method processes of FIG. 1 are illustrated in FIGS. 2-6 and discussed below.

Continuous Streaming Biometric Data Method Processes

In one aspect, as generally illustrated in FIG. 1, a method for processing continuous streaming biometric digit data variously may include processes 110, 120, 130, 140 and 150.

Process 110 includes scanning a digit (e.g., a finger) relative to a sensor array. In alternative embodiments either the digit or the row of sensor elements may be moved relative to the other to effect a relative scanning motion. As discussed in greater detail below, in exemplary embodiments the sensor array generally includes a single row of sensor elements, e.g., a linear array. However, in exemplary embodiments the sensor array alternatively may include a plurality of sensor elements arranged in a non-linear array configuration, e.g., in a stepped or staggered pattern, where an offset of the pattern enables a greater linear density of sensor elements in a direction of the sensor array. In exemplary embodiments the sensor array may be part of a larger or composite array of sensors. In exemplary embodiments the sensor array may be one M×1 row of sensor elements of a M×N sensor array. In exemplary embodiments the sensor array may be a M×1 row of sensor elements having P sensor elements (P≦M) in common with a patch of P×Q sensor elements that constitute a motion sensor.

Process 120 includes detecting data associated with a scanned digit. In exemplary embodiments each sensor element of the sensor array may detect, on a continuous basis during the relative scanning motion, a predetermined characteristic of the scanned digit. In exemplary embodiments the predetermined characteristic may express topographic data, such as ridge and valley information defining a fingerprint of the digit. Sensor elements of the sensor array also may be used to help detect an amount of relative scanning motion (distance) or scanning speed of the digit in the scanning direction, as further discussed below.

Process 130 includes generating and outputting respective continuous streams of data associated with a scanned digit for each sensor element of the sensor array as the digit is scanned relative to the sensor array. In exemplary embodiments respective continuous streams of data may be output in parallel from sensor elements of the sensor array. In exemplary embodiments each continuous stream of data may express a time-based variation in a predetermined characteristic of the scanned digit detected by a sensor element of the sensor array. In exemplary embodiments the predetermined characteristic may express a topographic characteristic associated with a surface of the digit, such as ridge and valley information defining a fingerprint of the digit.

Process 140 includes discrete sampling the respective continuous streams of data. In exemplary embodiments respective continuous streams of data may be converted from analog to digital format (digitized). In exemplary embodiments the discrete sampling of respective continuous streams of data may be performed in parallel. In exemplary embodiments respective continuous streams of data may be sampled at a sampling rate determined in accordance with a reconstruction characteristic. In exemplary embodiments the sampling rate (or reconstruction characteristic) may be determined in accordance with an amount of movement or speed detected in process 120. In exemplary embodiments the sampling rate (or reconstruction characteristic) may be determined by a spatial frequency of a fingerprint, a geometry of the sensor, and a speed of the finger swipe. As discussed below, the reconstruction characteristic may be used to directly reconstruct and visualize an image of the digit's predetermined characteristic, e.g., to display a biometric characteristic image of the digit. As discussed below, in exemplary embodiments reconstruction may be from live streaming input or from recorded streaming input.

Process 150 includes reconstructing the discrete sampled data to express the predetermined characteristic of the digit. In exemplary embodiments the imaging apparatus may reconstruct the discrete sampled data to visualize an image of a biometric characteristic of the digit. In exemplary embodiments discrete sampled data expressing ridge and valley information of a fingerprint of the digit may be reconstructed to express the topography of the digit, i.e., the fingerprint of the digit. In exemplary embodiments the discrete sampled data may be provided in parallel streams and directly reconstructed in parallel. In exemplary embodiments the reconstruction may be performed in accordance with a reconstruction characteristic. In exemplary embodiments the reconstruction characteristic may be determined in accordance with detection data detected during the scanning motion in process 120. In exemplary embodiments reconstructed discrete sampled data may be visualized, e.g., by printing, projecting, displaying or otherwise imaging a fingerprint or other biometric characteristic image. It will be appreciated that this reconstruction process is much simplified relative to conventional M×N matrix processing because it is not necessary to store the data in slices and then reconstruct/stitch together overlapping slices of the matrix having redundant information.

In another aspect, a method of processing biometric digit data may include processes 110, 120, 130, 131, 132, 140 and 150. In this aspect, processes 110, 120, 130, 140 and 150 generally operate substantially as described above. In this aspect, however, process may flow through a Recording Option 1, from process 130 to 131 to 132 to 140. Process 131 includes recording/storing in memory respective continuous streams of data read out from plural sensors of the sensor array. In exemplary embodiments the data may be stored in memory in parallel. In exemplary embodiments the respective continuous streams of data may be generated and stored in analog format. Process 132 includes reading out continuous streams of data stored in memory. In exemplary embodiments the continuous streams of data may be read out of memory in parallel. Process 140 includes discrete sampling the respective continuous steams of data read out from memory, e.g., converting the data from analog to digital format. It will be appreciated that this aspect provides a method of processing biometric data that permits data of respective continuous streams of data to be stored in memory in original analog form, and read back out from memory at any desired time, and at any desired location. That is, in one aspect, one method may include processes 110, 120, 130 and 131, and a separate method may include processes 132, 140 and 150. It also will be appreciated that the biometric data may be stored in memory in its original analog format. Those skilled in the art will appreciate that in certain applications this method may provide improved fidelity in recording and reproducing the original biometric data information for later processing.

In another aspect, a method of processing biometric digit data may include processes 110, 120, 130, 140, 141, 142 and 150. In this aspect, processes 110, 120, 130, 140 and 150 again generally operate substantially as described above. In this aspect, however, process may flow through a Recording Option 2, from process 140 to 141 to 142 to 150. Process 141 includes storing the discrete sampled data in memory. In exemplary embodiments the discrete sampled data may be stored in parallel. In exemplary embodiments the discrete sampled data may be multiplexed prior to storage in memory. Process 142 includes reading the discrete sampled data out from memory, and process 150 includes reconstructing the discrete sampled data. In exemplary embodiments the discrete sampled data may be read out in parallel. It will be appreciated that this aspect provides an alternative data storage method that permits the discrete sampled biometric data to be stored in memory in digital form, and read back out from memory at any desired time, and at any desired location. That is, in one aspect, one method may include processes 110, 120, 130, 140 and 141, and a separate method may include processes 142 and 150. Those skilled in the art readily will appreciate that in certain applications this method may reduce required memory and provide increased bandwidth, speed and efficiency in processing biometric digit data information.

Additional biometric data processing methods variously including the above-discussed processes illustrated in FIG. 1 also may be performed. For example, in another aspect, one method may include processes 110, 120, 130 and 131, a separate method may include processes 132, 140 and 141, and a further separate method may include processes 142 and 150. Those skilled in the art readily will be able to utilize the illustrated and above-discussed processes in various combinations to achieve a desired application.

Proposed Continuous Streaming Biometric Data Processing Apparatus

Aspects of the present invention may be implemented in software, hardware, or a combination thereof. Method processes described herein may be implemented using any known or later developed apparatus or means for achieving the desired process(es).

Figure 2A:
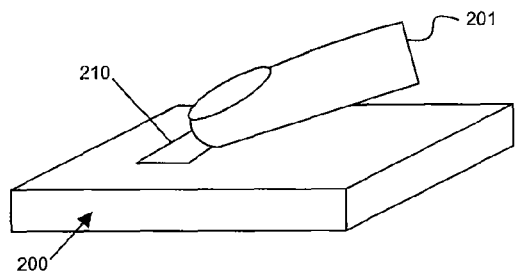
FIGS. 2A, 2B and 2C illustrate exemplary embodiments of swipe sensor apparatus configured to implement method processes of FIG. 1.
Figure 2B:
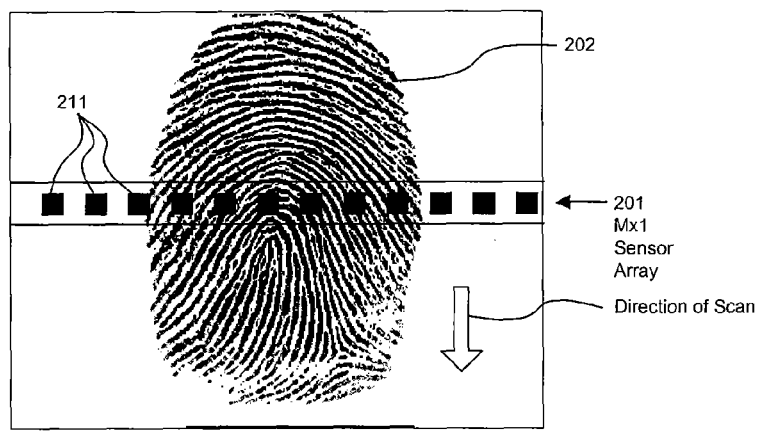
Figure 2C:
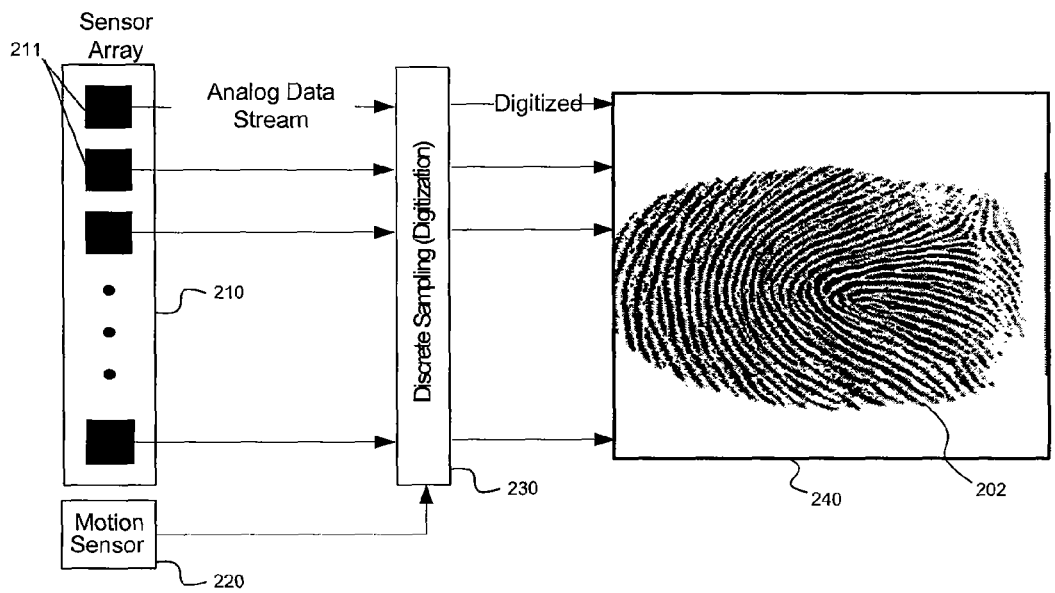

FIGS. 2A, 2B and 2C illustrate exemplary proposed swipe sensor apparatus and methods according to aspects of the present invention. FIG. 2C schematically illustrates elements of exemplary swipe sensor apparatus 200, generally including a sensor array 210, a motion sensor 220, a discrete sampler (digitizer) 230 and imaging apparatus 240. FIG. 2A illustrates a digit (a finger) 201 being scanned relative to a sensor array 210 (finger swipe device); FIG. 2B graphically illustrates an interface of digit 201 with the sensor array 210, illustrated as a fingerprint 202 of digit 201, during scanning of the digit 201 relative to the sensor array 210. The exemplary apparatus of FIGS. 2A, 2B and 2C may be used to implement method processes of FIG. 1.

The sensor array 210 generally includes a single row of sensor elements 211. That is, sensor array 210 generally includes a M×1 array of sensor elements 211. Each of the plurality of sensor elements 211 (and the composite sensor array 210) may be any known or later developed structure suitable for sensing (detecting) a predetermined characteristic of a digit 201 scanned relative to sensor array 210 and for generating a continuous stream of data (e.g. an analog data stream) associated with the detected characteristic of the scanned digit 201. In exemplary embodiments each sensor element may be a separate structure. Alternatively, in exemplary embodiments a sensor array may be an integrated structure including an array of functional sensor element portions. In exemplary embodiments the detected characteristic may be a biometric characteristic of the digit. Those skilled in the art readily will appreciate alternative structures suitable for detecting/capturing biometric characteristic data and generating continuous data streams for a desired application.

In exemplary embodiments each sensor element 211 may be a piezoelectric impedance based sensor element. Commonly assigned U.S. Pat. No. 6,720,712 entitled "Piezoelectric Identification Device And Applications Thereof" (Scott, et al.) discloses an identification device having a piezoelectric sensor array used to obtain biometric data of a digit. An exemplary device has several operating modes for obtaining a variety of biometric data, including an impedance detecting mode, a voltage detection mode, an imaging mode, and a Doppler-shift detecting mode. The device is capable of capturing a fingerprint, forming a three-dimensional map of a finger bone, and/or determining the direction and speed of arteriole and/or capillary blood flow in a finger. In exemplary embodiments, the Scott '712 patent discloses apparatus and methods that utilize a piezoelectric sensor array or a multi-layer sensor array structure having a polarized fluoropolymer film, such as a polyvinylidene flouride (PVDF), as a piezoelectric layer disposed between two conductor grids. The conductor grids may be arranged orthogonal to one another and obtain electronic data from the piezoelectric layer. In exemplary embodiments, a sensor device may include multiplexers connected to the conductor grids that are switched to control the sensor array, and a processor, coupled to the sensor array that receives an input from the sensor and processes biometric data. The content of the Scott '712 patent is incorporated by reference herein in its entirety. Those skilled in the art readily will appreciate how to use a piezoelectric sensor array of the '712 patent to achieve exemplary embodiments of the present invention as described herein.

A size and layout of sensor array 210 may be selected in accordance with a desired application. For example, a width of sensor array 210 may be selected in accordance with a maximum width of a digit 201 to be scanned. The number M of sensor elements 211 in a M×1 sensor array 210 is determined by the width of the sensor array 210 and the spacing of the sensor elements 211 in a direction of the array. The spacing (density) may be selected in accordance with a desired image resolution. The sensor elements 211 may be arranged at predetermined intervals. In exemplary embodiments, the sensor elements 211 may be arranged at equal intervals corresponding to a desired or required spatial resolution accuracy. An exemplary interval is the generally accepted industry standard for fingerprint scanners of 500 dots per inch (dpi; or pixels per inch, ppi). This resolution/density standard also corresponds to the United States Federal Bureau of Investigation's (FBI's) current IAFIS standard. The ridge/valley frequency of a typical fingerprint is on the order of 500 um per ridge/valley cycle (50.8 cycles per inch) (see Stosz and Alyea, "Automated System for Fingerprint Authentication Using Pores and Ridge Structure," Proceedings of SPIE Conference on Automatic Systems for the Identification and Inspection of Humans, Vol. 2277, pp. 210-223 (1994)). Nyquist sampling theory states that two discrete samples are required for every cycle of the highest frequency of interest. Thus, such standard requires that the sensor elements 211 are arranged with a density of 500 per inch in the M direction of an M×1 sensor array.

Figure 3A:
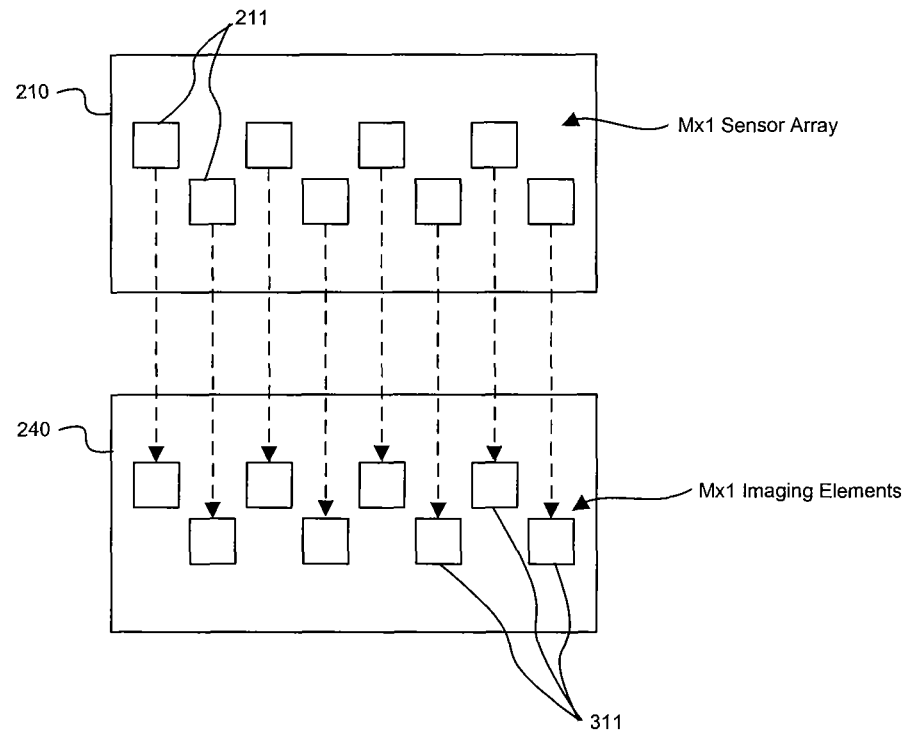
FIGS. 3A and 3B illustrate alternative sensor array configurations.

Arrangement of the sensor elements 211 may be determined in accordance with a number of factors, such as size, shape and electrical connectivity requirements of the sensor elements 211. The arrangement of the sensor elements 211 in the sensor array 210 may be linear or non-linear. For example, as schematically illustrated in the exemplary embodiment of FIGS. 2B and 2C, the sensor elements may be arranged linearly. Alternatively, a plurality of sensor elements 211 may be arranged in a non-linear configuration, e.g., in a staggered or stepped configuration. FIG. 3A illustrates an exemplary embodiment in which a plurality of sensor elements 211 are arranged in a staggered, single step configuration, with odd and even sensor elements alternately stepped or offset in two rows relative to a central line extending in the M direction of the M×1 sensor array 210. In an exemplary two step configuration (not shown), three rows of sensor elements may be provided in staggered configuration. It will be appreciated that these exemplary non-linear arrangements may permit a greater density of sensor elements 211 in the M direction of an M×1 sensor array, e.g., where placement of the sensor elements in a linear arrangement may be restricted or prohibited due to the size, shape and electrical connectivity requirements of the sensor elements and the like.

It will be appreciated that, in exemplary embodiments, methods and/or apparatus variously may compensate for a stepped or staggered arrangement of sensor elements. For example, as illustrated in FIG. 3A, corresponding imaging elements (e.g., printing elements) 311 of an imaging apparatus 240 likewise may be arranged in a corresponding staggered/stepped pattern. This parallel arrangement of elements may be particularly suited for methods and apparatus that perform direct, parallel data stream imaging/printing of a scanned digit according to a method of the present invention. Alternatively, a software or hardwire fix, e.g., a process or time delay, selectively may be applied to signals of respective sensor elements 211 to compensate for a time difference or mechanical difference (spacing of offset) between respective rows of staggered/stepped sensor elements. It further will be appreciated that a software or hardwire fix may be provided at a point of generating the respective continuous steams of data, at a point of discrete sampling of the streaming data, or at a point of imaging the discrete sampled data. Those skilled in the art readily will be able to select a desired arrangement of sensor elements and data processing suitable for a desired application. Those skilled in the art also readily will appreciate alternative ways of compensating for a staggered or stepped arrangement of sensor elements.

The motion sensor 220 may be any known or later developed structure or module (software, hardware or hardwire) suitable for detecting motion of a digit in a scanning direction of the digit relative to the sensor array 210. In exemplary embodiments the motion sensor 220 may be an optical mouse chip. The optical mouse chip may be turned upside down and arranged in-line with a direction of the digit scanning motion. See Horn and Schunck, "Determining Optical Flow," Artificial Intelligence Laboratory, Massachusetts Institute of Technology, March 1980.

Figure 3B:
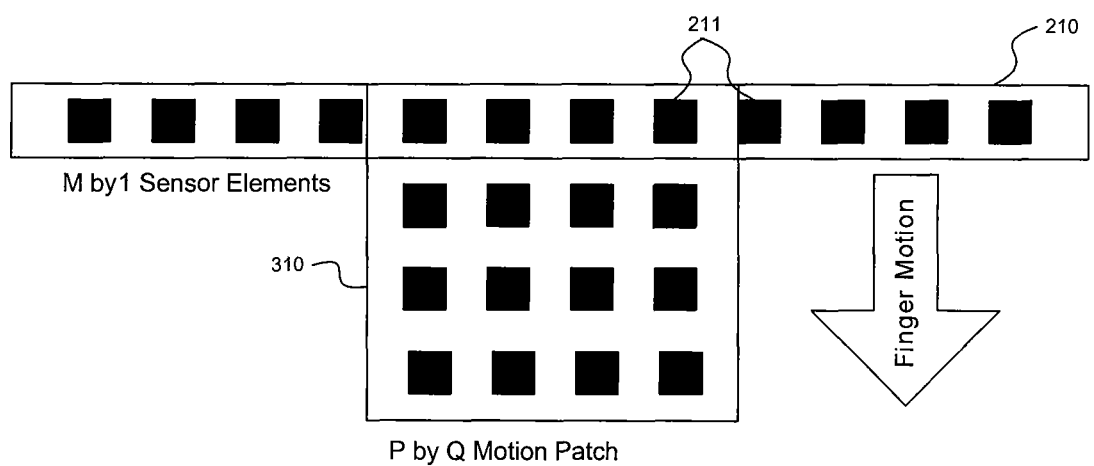

Alternatively, in exemplary embodiments the motion sensor 220 may be a P×Q array of sensor elements. The size, shape and make-up of the P×Q array of sensors is not limited. The P×Q array of sensor elements may be any array of sensor elements suitable for detecting movement of a digit relative to the sensor elements. In exemplary embodiments, the P×Q array may be a rectangular grid, e.g., a 16×16 grid of sensor elements. In exemplary embodiments, the P×Q array of sensor elements may be the same type sensor elements as the M×1 array of sensor elements 211. In exemplary embodiments the P×Q array of sensors may be separate from or integrated with the M×1 array of sensor elements 211. FIG. 3B illustrates an exemplary embodiment of a P×Q array of sensor elements 310 that has a P×1 row of sensor elements common to the M×1 array of sensor elements 211.

Those skilled in the art readily will appreciate alternative structures and arrangements for detecting motion and/or speed of motion of the digit in a scanning direction of the digit relative to the sensor array suitable for a desired application.

The sampler 230 may be any known or later developed structure or module (software, hardware or hardwire) suitable for discrete sampling (digital sampling or "digitizing") a plurality of continuous streams of data output by respective sensor elements 211 of sensor array 210. In exemplary embodiments the sampler 230 converts the plurality of continuous streams of data from analog to digital format. In exemplary embodiments the sampler 230 includes one or more analog-to-digital converters (A/D converters). As illustrated in FIG. 2A, in exemplary embodiments the sampler 230 may discrete sample the respective steams of data in parallel in accordance with an output from the motion sensor 220. In exemplary embodiments discrete sampling may be performed using a plurality of A/D converters arranged in parallel. The number of A/D converters may vary in a range of 1 to M, where M is the number of sensor elements 211 in the sensor array 210. It will be appreciated that the processing time for discrete sampling a plurality of sensor elements 211 of the sensor array 210 may be proportional to the number of A/D converters.

A sampling rate may be determined by a spatial frequency of digit characteristic (e.g., fingerprint), a geometry of the sensor elements and a digit swipe speed. In exemplary embodiments the discrete sampling may be performed at a sampling rate corresponding to a predetermined spatial resolution/frequency. In exemplary embodiments the spatial resolution/frequency may be a measured $1/500^{th}$ of an inch, consistent with the current industry and FBI's IAFIS standards for fingerprint image resolution/density.

The imaging apparatus 240 may include any known or later developed structure or module (software, hardware or hardwire) suitable for reconstructing discrete sampled data. In exemplary embodiments the imaging apparatus may include an imaging device, such as an image projector, a image display, and the like.

Figure 4:
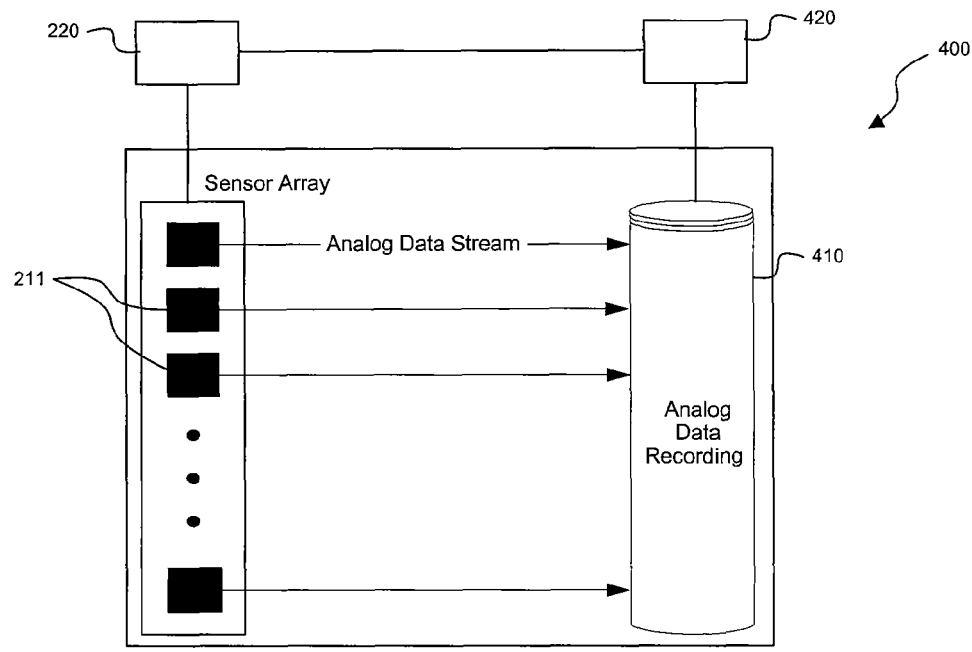
FIG. 4 schematically illustrates another embodiment of swipe sensor apparatus configured to implement method processes of FIG. 1.

FIG. 4 schematically illustrates another exemplary embodiment of swipe sensor apparatus configured to implement method processes of FIG. 1. In exemplary embodiments digit data processing apparatus 400 generally may include a sensor array 210 including an array of sensor elements 211 and memory 410 configured for recording (storing) data in analog form. In exemplary embodiments memory 410 may be configured to record plural analog data signals in parallel. In exemplary embodiments memory 410 may be configured to record respective continuous streams of data (analog data streams) from the individual sensor elements 211 of sensor array 210. In exemplary embodiments memory 410 may be a drum, magnetic tape or other endless recording medium driven by a motor 420, and apparatus 400 may include a motion sensor 220. In exemplary embodiments the motor 420 may be driven in accordance with a an output of a scanning motion sensor 220, e.g., at a speed determined in accordance with a scanning motion or a scanning speed detected by motion sensor 220. In exemplary embodiments it will be appreciated that apparatus 400 may implement method processes 110, 120, 130 and 131, as discussed above.

Figure 5:
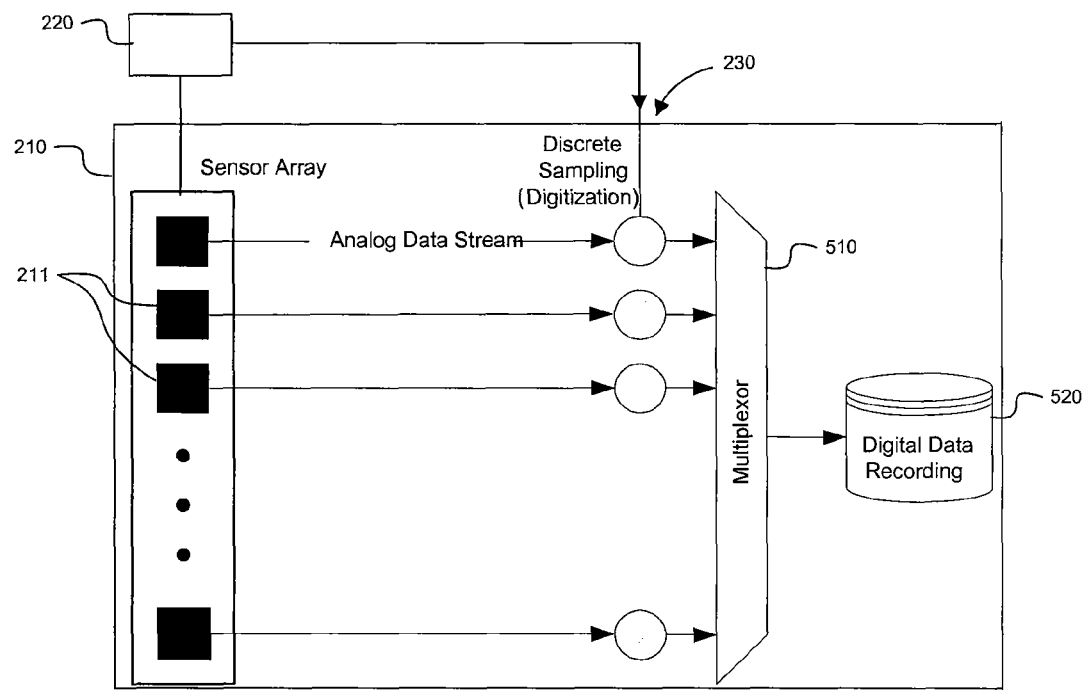
FIG. 5 graphically illustrates yet another embodiment of swipe sensor apparatus configured to implement method processes of FIG. 1.

FIG. 5 graphically illustrates another exemplary embodiment of swipe sensor apparatus configured to implement method processes of FIG. 1. In exemplary embodiments digit data processing apparatus 500 generally may include a sensor array 210 including an array of sensor elements 211, a motion sensor 220, a sampler 230, a multiplexer 510 and a digital memory 520. In exemplary embodiments of FIG. 5, respective analog streams of data output from sensor elements 211 are discrete sampled at a sample rate determined in accordance with an output of a motion detector 220. The discrete sample data is multiplexed by multiplexer 510 and the multiplexed data is stored in memory 520.

A biometric characteristic image, such as a fingerprint image, may be reconstructed directly from parallel streams of discrete sampled data, either live or from recorded data. Accurate reconstruction of a fingerprint image from either source of data requires knowledge of the movement (or speed of movement) of the digit/finger as it is scanned relative to the array of sensors. As variously described and illustrated in exemplary embodiments herein, speed or movement data may be provided by a separate motion sensor, or it may be algorithmically extracted from the live or recorded data.

In exemplary embodiments fingerprint image reconstruction from parallel streams of discrete sampled data may be performed using well known image re-sampling techniques. Examples of such techniques may be found Braunegg et al, "Rescaling Digital Fingerprints; Techniques and Image Quality Effects", MITRE Report for FBI Fingerprint Project (1995).

Alternatively, in exemplary embodiments a method of fingerprint reconstruction may be performed by providing a fixed pixel pitch, or sensor element spacing, in an M×1 sensor array (e.g., 500 pixels per inch; see discussion of sensor element spacing above), and then re-sampling respective streams of data output by the sensor array so as to obtain 500 samples per inch, to match the spacing of the sensor elements. This re-sampling provides a M×N image in which corresponding x and y axis directions of the image have a desired spatial resolution of 500 samples per inch (dpi). See, e.g., FIGS. 1 and 2A-2C.

It is possible to derive temporal resolution requirements based on a desired spatial resolution requirement. For example, based on the FBI's 500 dpi specification, each parallel data stream recorded from the sensor elements must provide at least 250 cycles per inch of resolution in the scanning direction relative to the sensor array. The analog bandwidth of an individual sensor element data stream can be derived from the 500 dpi requirement, together with another commonly accepted industry standard that states that the maximum finger speed for a finger swipe sensor is 20 cm/sec (7.8 in/sec). Thus, 7.8 in/sec×250 cycles/inch=1950 cycles/sec (Hz).

It also is possible to derive a discrete (or digital) sampling rate based on a desired resolution. For example, based on the FBI's 500 dpi specification and a maximum finger swipe speed of 7.8 in/sec, a discrete sampling rate may be determined as 7.8 in/sec×500 samples/in=3900 samples per second.

It will be appreciated that, while a spatial resolution accuracy in the M direction of an M×1 sensor array may be determined exactly by the spacing of the sensor elements, the resolution accuracy in the N direction (transverse direction relative to the sensor array) is determined by the accuracy of the motion sensor. In exemplary embodiments, a desired resolution accuracy in the motion sensor is about 1-2%.

In exemplary embodiments a discrete sampling of all sensor elements in the M×1 sensor array may be triggered each time the finger moves a predetermined distance. In exemplary embodiments, the amount of movement (predetermined distance) may be $1/500$ in, corresponding to a 500 dpi resolution.

Alternatively, in exemplary embodiments a discrete sampling of all sensor elements in the M×1 sensor array may be triggered at a fixed time interval. In exemplary embodiments, the fixed time interval may be predetermined to achieve a desired image resolution. In such embodiments, an output of the motion sensor may be recorded along with the sampled value of the continuous stream of data. During reconstruction of this discrete sampled data, the stream of data may be post-processed using the motion data to re-sample the stream of data at exact intervals of 1/500 in.

In each of the above discussed aspects and exemplary embodiments, it will be appreciated that not all sensor elements 211 of the sensor array 210 need generate/output data for every scan. For example, where a width of a digit is not as wide as a width of the sensor array 210, sensor elements 211 outside the width of the digit do not scan the digit and do not generate/output data associated with the digit. Thus, it may not be necessary to output a continuous stream of data from such one(s) of sensor elements 211; alternatively, it may not be necessary to record/store a continuous stream of data from such one(s) of sensor elements 211; alternatively, it may not be necessary to discrete sample corresponding one(s) of said continuous streams of data; or alternatively, it may not be necessary to record/store corresponding discrete sampled data for such one(s) of sensor elements 211. Eliminating such non-essential data processing may substantially reduce processing bandwidth and increase a speed and efficiency of processing essential biometric characteristic data. Selective processing of essential data may be achieved by filtering out non-essential data or data streams. Those skilled in the art readily will appreciate alternative detection, filtering and control structures and methods for eliminating non-essential data processing.

Above-described aspects of the present invention may be implemented in the environment of a computer system or other processing system. An example of such a computer system 600 is shown in FIG. 6.

Figure 6:
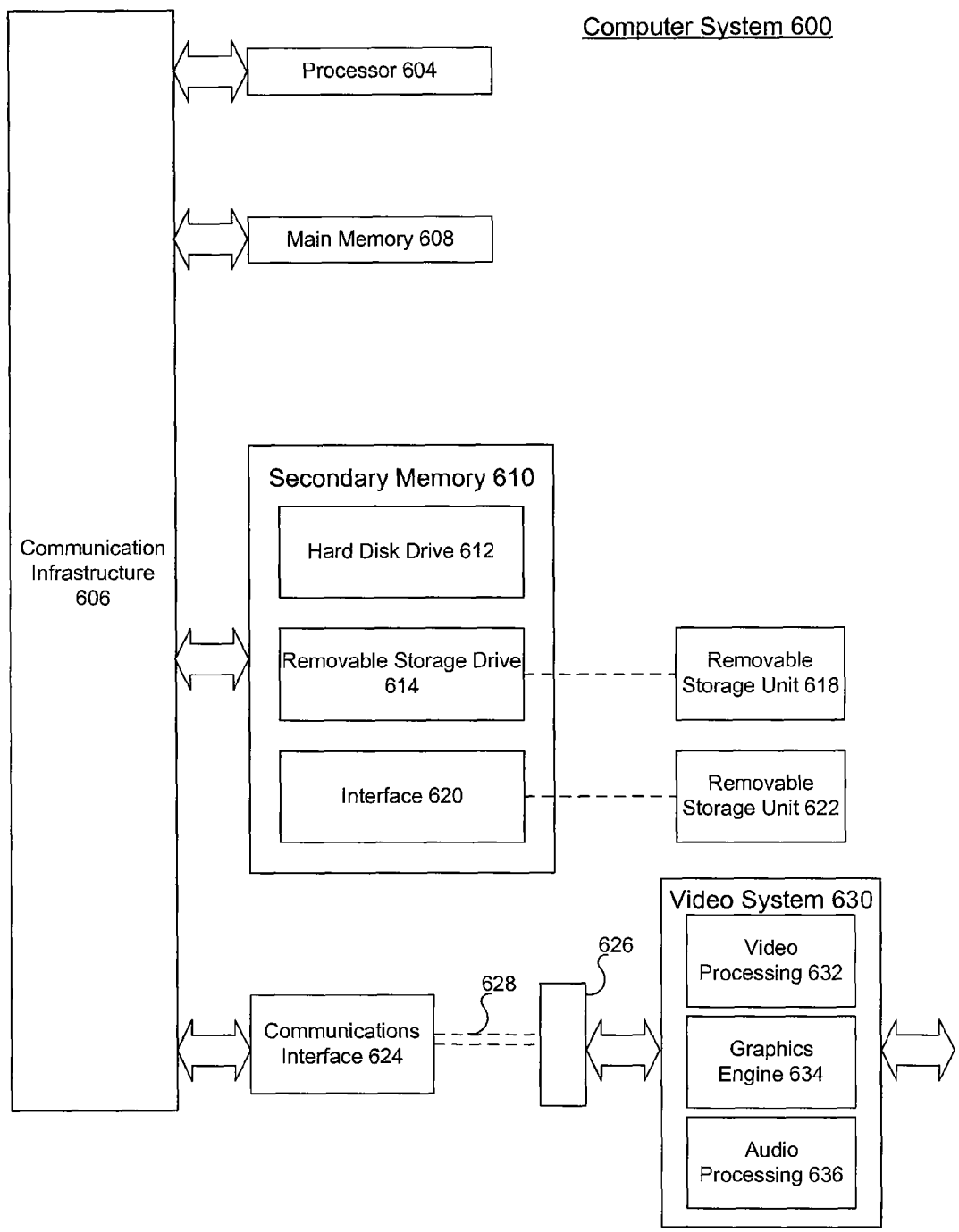
FIG. 6 schematically illustrates a computer system suitable for implementing various method processes of FIG. 1.

In FIG. 6, a computer system 600 includes one or more processors, such as a processor 604. The processor 604 can be a special purpose or a general purpose digital signal processor. The processor 604 is connected to a communication infrastructure 606 (for example, a bus or network). Various software implementations are described in terms of this exemplary computer system. After reading this description, it will become apparent to a person skilled in the relevant art how to implement the invention using other computer systems and/or computer architectures.

The computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, analog memory, etc. The removable storage drive 614 reads from and/or writes to a removable storage unit 618 in a well known manner. The removable storage unit 618, represents a floppy disk, magnetic tape, optical disk, analog memory, etc. which is read by and written to by removable storage drive 614. As will be appreciated, the removable storage unit 618 includes a computer usable storage medium having stored therein computer software and/or data.

In alternative implementations, the secondary memory 610 may include other similar means for allowing computer programs or other instructions to be loaded into the computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and the other removable storage units 622 and the interfaces 620 which allow software and data to be transferred from the removable storage unit 622 to the computer system 600.

The computer system 600 may also include a communications interface 624. The communications interface 624 allows software and data to be transferred between the computer system 600 and external devices. Examples of the communications interface 624 may include a modem, a network interface (such as an Ethernet card), a communications port, a PCMCIA slot and card, etc. Software and data transferred via the communications interface 624 are in the form of signals 628 which may be electronic, electromagnetic, optical or other signals capable of being received by the communications interface 624. These signals 628 are provided to the communications interface 624 via a communications path 626. The communications path 626 carries the signals 628 and may be implemented using wire or cable, fiber optics, a phone line, a cellular phone link, an RF link and other communications channels.

In the present application, the terms "computer readable medium" and "computer usable medium" are used to generally refer to tangible media such as the removable storage drive 614, and a hard disk installed in the hard disk drive 612. In alternative applications, signals 628 may form non-tangible computer readable medium or computer usable medium. These computer program products are means for providing software to the computer system 600.

Computer programs (also called computer control logic) are stored in the main memory 608 and/or the secondary memory 610. Computer programs may also be received via the communications interface 624. Such computer programs, when executed, enable the computer system 600 to implement the present invention as discussed herein.

In particular, the computer programs, when executed, enable the processor 604 to implement processes of the present invention. Accordingly, such computer programs represent controllers of the computer system 600. By way of example, in exemplary embodiments of the invention, the processes/methods performed by signal processing blocks of encoders and/or decoders can be performed by computer control logic. Where the invention is implemented using software, the software may be stored in a computer program product and loaded into the computer system 600 using the removable storage drive 614, the hard drive 612 or the communications interface 624.

Proposed Exemplary Apparatus

The following proposes exemplary apparatus that generally would satisfy U.S. Government PIV specifications, including the following (note: the PIV specifications include additional details not addressed herein):

| Parameter | Requirement |
| --- | --- |
| Capture size | ≦12.8 mm wide by ≦16.5 mm high |
| True Optical or Native Resolution (Nyquist frequency) | ≦500 ppi in sensor detection row & column directions |
| Resolution Scale | 490 ppi-510 ppi in sensor detector row and column directions |
| Image Type | Capability to output monochrome image at 8 bits per pixel, 256 gray-levels (prior to any compression) |

In exemplary embodiments discussed above, the capture size width requirement would be met by a 256×1 sensor array pitched at 500 dpi, which would result in a 13.00 mm width.

The capture size height requirement would be met by recording 325 samples per channel spaced at 500 dpi, which corresponds to a 16.51 mm height.

The true optical or native resolution requirement automatically would be met in exemplary embodiments discussed above by a swipe sensor including a sensor array of piezoelectric sensor element that measures (detects) in direct contact with the digit (e.g., finger). It will be appreciated that no interpolation or resealing of any kind would be performed or required on the data presented by final output of such sensor array/sensor elements.

The resolution requirement of 490-510 dpi would be met in the column (width) direction by a pixel pitch of exactly 500 dpi. This resolution requirement may be met in the row (height) direction by providing a finger motion/velocity sensor that has an accuracy of +/−2%.

The image type requirement of 8-bits and 256 gray scale levels may be provided by an analog to digital converter used to perform the discrete sampling. In exemplary embodiments, a typical technique is to discrete sample (digitize) to 10 or more bits and window the results down to 8-bits of data, which would provide the required 256 gray levels.

Storage (memory space) required for a fingerprint image having a size of 256×325 by 1 byte (8-bits) is 83,200 bytes. As noted above, the raw 10-bit A/D output may be windowed down to 8-bits prior to transmission.

Discrete sampling (A/D conversion) speed required is 3900 samples per second per each of the 256 parallel channels, as discussed above. This leads to an overall discrete sampling (digitization) rate of 998,400 samples per second at 10-bits per sample. In exemplary embodiments, Sparrow ASCI utilizes 8 A/D converters each of which may discrete sample 8-bits at IM samples per second.

Conclusion

It will be appreciated that exemplary embodiments described and proposed above variously overcome the above-discussed drawbacks of image skew and post-processing requirements common to M×N rectangular grid sensor arrays. By using only a single row array of sensor elements, image skew may be eliminated completely in the case where the continuous streams of data are recorded as analog recordings, or reduced to at most one pixel of skew from the beginning of the row of sensor elements to the end of the row of sensor elements in the case where digital data (discrete sampled data) is recorded. Further, this maximum of one pixel skew may be reduced by using more than one A/D converter in parallel. Reconstruction of slices is avoided completely since the biometric data is not recorded in the form of slices, but rather is recorded directly, in full image format.

The exemplary embodiments described herein are presented for illustrative purposes only. Other embodiments, aspects and features of the present invention readily will be apparent to persons skilled in the relevant art(s) based on the teachings contained herein. The foregoing description of the exemplary embodiments will so fully reveal the general nature of the invention that others can, by applying knowledge within the skill of the art, readily modify and/or adapt for various applications such specific embodiments, without undue experimentation, and without departing from the general concept of the invention. Therefore, such adaptations and modifications are intended to be within the meaning and range of equivalents of the disclosed embodiments, based on the teaching and guidance presented herein. It is to be understood that phraseology or terminology used herein is for the purpose of description and not as limitation. The terminology or phraseology of the present specification is to be interpreted by the skilled artisan in light of the teachings and guidance.

The breadth and scope of the present invention should not be limited by any of the above described exemplary embodiments, but should be defined only in accordance with the following claims and their equivalents.

What is claimed is:

1. A method for processing digit data, comprising:
outputting from individual sensor elements of only one row of an array of sensor elements respective continuous streams of data associated with a digit scanned in a transverse direction relative to the one row of sensor elements, wherein the outputting from all of the sensor elements within the row occurs in parallel;
discrete sampling the respective continuous streams of data in accordance with a reconstruction characteristic; and
reconstructing the discrete sampled data in accordance with the reconstruction characteristic; and
wherein said discrete sampling is performed at a sampling rate determined on the basis of a scanning speed in the transverse direction detected by a motion detector.

2. The method of claim 1, further comprising:
constructing the discrete sampled data to form a biometric characteristic image associated with the digit.

3. The method of claim 1, further comprising:
detecting a scanning movement of the digit in a transverse direction of the row of sensor elements; and
discrete sampling the continuous streams of data in accordance with an amount of scanning movement in the transverse direction.

4. The method of claim 1, further comprising:
detecting a scanning speed of the digit in a transverse direction of the row of sensor elements; and
discrete sampling the continuous streams of data in accordance with the scanning speed.

5. The method of claim 1, the discrete sampling including sampling the continuous streams of data at a sampling rate determined by a predetermined spatial resolution accuracy.

6. The method of claim 1, the discrete sampling including sampling the continuous streams of data at a predetermined time interval.

7. The method of claim 1, the discrete sampling including sampling the continuous streams of data at a fixed time interval.

8. The method of claim 7, further comprising:
recording each discrete sample together with a scanning speed of the digit in the transverse direction.

9. A method for processing digit data, comprising:
outputting in parallel from individual sensor elements of only one row of an array of sensor elements respective continuous streams of data associated with a digit scanned in a transverse direction relative to the one row of sensor elements; and
recording the continuous streams of data; and
wherein discrete sampling is performed at a sampling rate determined on the basis of a scanning speed in the transverse direction detected by a motion detector.

10. The method of claim 9, further comprising:
detecting an amount of scanning movement in the transverse direction; and recording the continuous streams of data together with data associated with the scanning movement in the transverse direction.

11. The method of claim 9, further comprising:
detecting an amount of scanning movement in the transverse direction; and recording the continuous streams of data together with data associated with a scanning speed in the transverse direction.

12. The method of claim 11, wherein the scanning speed is discontinuous.

13. The method of claim 9, said recording including controlling a speed of recording in accordance with the amount of scanning movement in the transverse direction.

14. The method of claim 9, said recording including controlling a speed of recording in accordance with a scanning speed in the transverse direction.

15. A method for processing digit data, comprising:
receiving in parallel a plurality of continuous streams of data, the continuous streams of data being associated with respective individual sensor elements of only one row of an array of sensor elements and including information generated in
response to scanning a digit in a transverse direction relative to the one row of sensor elements; and
discrete sampling the plurality of continuous streams of data in accordance with a reconstruction characteristic; and
wherein said discrete sampling is performed at a sampling rate determined on the basis of a scanning speed in the transverse direction detected by a motion detector.

16. The method of claim 15, further comprising:
receiving, with the continuous streams of data, data associated with an amount of scanning movement of the digit in the transverse direction, and
discrete sampling the plurality of continuous streams of data in accordance with the amount of scanning movement.

17. The method of claim 15, further comprising receiving, with the continuous streams of data, data associated with a scanning speed of the digit in the transverse direction, and
discrete sampling the plurality of continuous streams of data in accordance with the scanning speed.

18. The method of claim 17, wherein the scanning speed is discontinuous.

19. The method of claim 15, further comprising:
reconstructing the discrete sampled data to form a biometric characteristic image associated with the digit.

20. Digit data processing apparatus comprising:
an array of sensor elements configured to detect a digit scanned in a transverse direction relative to the row of sensor elements, only one row of individual sensor elements of the array of sensor elements being configured to output in parallel respective continuous streams of data associated with the digit detected by the individual sensor element during scanning; and
a sampler configured for discrete sampling of continuous streams of data output in parallel by said individual sensor elements in accordance with a reconstruction characteristic; and
wherein said discrete sampling is performed at a sampling rate determined on the basis of a scanning speed in the transverse direction detected by a motion detector.

21. The apparatus of claim 20, further comprising:
said motion detector configured to detect an amount of scanning movement of the digit in the transverse direction.

22. The apparatus of claim 21, the sampler being configured to discrete sample the continuous streams of data in accordance with the amount of scanning movement of the digit detected by said motion detector, 23. The apparatus of claim 21, the sampler being configured to discrete sample the continuous streams of data at a sampling rate determined by a predetermined amount of scanning movement in the transverse direction detected by said motion detector.

24. The apparatus of claim 21, the sampler being configured to discrete sample the continuous streams of data at a sampling rate determined on the basis of a scanning speed in the transverse direction detected by the motion detector.

25. The apparatus of claim 21, the sampler being configured to discrete sample the continuous streams of data at a sampling rate determined by a predetermined spatial resolution accuracy.

26. The apparatus of claim 25, the predetermined spatial resolution being 500 dots per inch (dpi), the array of sensor elements being arranged at a pitch of $\frac{1}{500}^{th}$ of an inch, and the sampler being configured to discrete sample the continuous streams of data at a sampling rate corresponding to $\frac{1}{500}^{th}$ of an inch of scanning movement in the transverse direction.

27. The apparatus of claim 20, the sampler being configured to discrete sample the continuous streams of data at a sampling rate determined by a predetermined time interval.

28. The apparatus of claim 21 the sampler being configured to discrete sample the continuous streams of data at a sampling rate determined by a fixed time interval.

29. The apparatus of claim 28, further comprising memory that stores the discrete sampled data together with a detected scanning speed of the digit in the transverse direction detected by said detector.

30. The apparatus of claim 20, further comprising an imaging device that reconstructs the discrete sampled data to form a biometric characteristic image associated with the digit.

31. The apparatus of claim 21, further comprising an imaging device that reconstructs the discrete sampled data to form a biometric characteristic image associated with the digit.

32. The apparatus of claim 20, further comprising a multiplexer that converts discrete samples of the parallel continuous streams of data to a single digital signal.

33. The apparatus of claim 31, further comprising memory that stores the digital signal.

34. The apparatus of claim 21, further comprising an imaging device that reconstructs the continuous streams of data recorded by the recorder to form a biometric characteristic image associated with the digit.

35. The apparatus of claim 20, the individual sensor elements being impedance based sensor elements.

36. The apparatus of claim 35, the individual sensor elements being piezoelectric impedance based sensor elements.

37. The apparatus of claim 21, the detector comprising an optical mouse chip.

38. The apparatus of claim 21, the detector comprising a rectangular array of sensor elements.

39. The apparatus of claim 38, the rectangular array of sensor elements being integral with the array of sensor elements.

40. The apparatus of claim 38, the rectangular array of sensor elements being independent from the array of sensor elements.

41. The apparatus of claim 38, the rectangular array of sensor elements being arranged in the transverse direction.

42. Digit data processing apparatus comprising:
an array of sensor elements configured to detect a digit scanned in a transverse direction relative to the array of sensor elements, individual sensor elements of only one row of the individual sensor elements being configured to output in parallel respective continuous streams of data associated with the digit detected by said individual sensor elements during scanning; and
a memory that stores in parallel the respective continuous streams of data output by the row of individual sensor elements; and
wherein a discrcte sampling is performed at a sampling rate determined on the basis of a scanning speed in the transverse direction detected by a motion detector.

43. The digit data processing apparatus of claim 42, further comprising:
- said detector that detects an amount of scanning movement of the digit in the transverse direction; and
- said recorder recording the continuous streams of data in accordance with a scanning speed of the digit in the transverse direction detected by said detector.

44. The digit data processing apparatus of claim 42, further comprising:
- said detector configured to detect an amount of scanning movement of the digit in the transverse direction; and
- said recorder recording the continuous streams of data together with a scanning speed of the digit in the transverse direction detected by said detector.

* * * * *